(12) United States Patent
Crabtree et al.

(10) Patent No.: US 11,534,973 B2
(45) Date of Patent: Dec. 27, 2022

(54) ADDITIVE MANUFACTURING

(71) Applicant: ADDITIVE MANUFACTURING TECHNOLOGIES LIMITED, Sheffield (GB)

(72) Inventors: Joseph Gwilliam Crabtree, Sheffield (GB); Konstantin Rybalcenko, Sheffield (GB); Andre Gaio, Sheffield (GB)

(73) Assignee: ADDITIVE MANUFACTURING TECHNOLOGIES LIMITED, Sheffield (GB)

( * ) Notice: Subject to any disclaimer, the term of this patent is extended or adjusted under 35 U.S.C. 154(b) by 0 days.

(21) Appl. No.: 17/058,879

(22) PCT Filed: May 24, 2019

(86) PCT No.: PCT/GB2019/051439
§ 371 (c)(1),
(2) Date: Nov. 25, 2020

(87) PCT Pub. No.: WO2019/224556
PCT Pub. Date: Nov. 28, 2019

(65) Prior Publication Data
US 2021/0221063 A1    Jul. 22, 2021

(30) Foreign Application Priority Data

May 25, 2018  (GB) ...................................... 1808639

(51) Int. Cl.
*B29C 64/35*   (2017.01)
*B33Y 40/20*   (2020.01)
(Continued)

(52) U.S. Cl.
CPC .............. *B29C 64/35* (2017.08); *B08B 3/102* (2013.01); *B08B 3/106* (2013.01); *B08B 3/12* (2013.01);
(Continued)

(58) Field of Classification Search
None
See application file for complete search history.

(56) References Cited

U.S. PATENT DOCUMENTS

| | | | |
|---|---|---|---|
| 5,616,067 | A | 4/1997 | Goenka |
| 2009/0014037 | A1 | 1/2009 | Richter et al. |

(Continued)

FOREIGN PATENT DOCUMENTS

| | | |
|---|---|---|
| CN | 110022122 B | 8/2021 |
| EP | 1 501 669 B1 | 11/2010 |

(Continued)

OTHER PUBLICATIONS

International Search Report issued in International Application No. PCT/GB2019/051439 dated Nov. 8, 2019 (6 pages).

(Continued)

*Primary Examiner* — Eric W Golightly
(74) *Attorney, Agent, or Firm* — Osha Bergman Watanabe & Burton LLP (57) ABSTRACT

An apparatus for removing powder from a powder-based additively manufactured part includes a chamber for locating a powder-based additively manufactured part therein, a support mesh for supporting a powder cake that includes one or more parts therein, an inlet for introducing a gas into the chamber to flow throughout the powder cake and fluidise the powder to disengage from the part, and an outlet to allow the gas to exit the chamber. The apparatus further includes a cryogenic blasting system for spraying a mixture of liquid (Continued)

$CO_2$ and compressed air at the powder-based additively manufactured part to remove powder therefrom.

5 Claims, 4 Drawing Sheets

(51) Int. Cl.
    *B08B 3/10*     (2006.01)
    *B08B 3/12*     (2006.01)
    *B08B 7/02*     (2006.01)
    *B08B 7/04*     (2006.01)
    *B29C 64/357*     (2017.01)
    *B29K 75/00*     (2006.01)
    *B29K 77/00*     (2006.01)

(52) U.S. Cl.
    CPC .................. *B08B 7/02* (2013.01); *B08B 7/04* (2013.01); *B33Y 40/20* (2020.01); *B29C 64/357* (2017.08); *B29K 2075/00* (2013.01); *B29K 2077/00* (2013.01)

(56) References Cited

U.S. PATENT DOCUMENTS

| | | |
|---|---|---|
| 2010/0132747 A1 | 6/2010 | Smith et al. |
| 2015/0258744 A1 | 9/2015 | Muller et al. |
| 2017/0144226 A1 | 5/2017 | Giulietti et al. |
| 2018/0297284 A1 | 10/2018 | Fulop et al. |

FOREIGN PATENT DOCUMENTS

| | | |
|---|---|---|
| EP | 2604709 A1 | 6/2013 |
| EP | 3170568 A1 | 5/2017 |
| GB | 2547070 A | 8/2017 |
| JP | 2011005668 A | 1/2011 |
| WO | 2016102970 A1 | 6/2016 |
| WO | 2017210460 A1 | 12/2017 |
| WO | 2018071428 A1 | 4/2018 |
| WO | 2018191689 A1 | 10/2018 |
| WO | 2019185651 A1 | 10/2019 |

OTHER PUBLICATIONS

Written Opinion issued in International Application No. PCT/GB2019/051439 dated Nov. 8, 2019 (14 pages).

Search Report issued in corresponding GB Application No. 1907373.3 dated Nov. 5, 2019 (5 pages).

Examination Report issued in corresponding EP Application No. 19730435.5 dated Nov. 25, 2021 (6 pages).

Examination Report issued in corresponding GB Application No. 1907373.3 dated Feb. 8, 2022 (6 pages).

ADDITIVE MANUFACTURING

BACKGROUND

The present invention relates to additive manufacturing (AM) and in particular, but not exclusively, the present invention relates to removing un-sintered powder from parts manufactured using a powder-based AM process.

Selective laser sintering (SLS) is an additive manufacturing (AM) technique that uses a laser as the power source to sinter powdered material (typically nylon/polyamide) by aiming the laser automatically at points in space defined by a 3D model to bind the material together and create a solid structure. The laser selectively fuses powdered material by scanning cross-sections generated from a 3-D digital description of the part (for example from a CAD file or scan data) on the surface of a powder bed. After each cross-section is +scanned, the powder bed is lowered by one-layer thickness, a new layer of material is applied on top, and the process is repeated until the part is completed. The process typically takes place in an inert gas environment to prevent the material, e.g. nylon, oxidising when heated by the laser beam. The temperature inside the build chamber is typically kept relatively high but below the melting point of the un-sintered powder, e.g. around 170° C. for nylon, so that the temperature increase required by laser to fuse the surface particles is relatively low. In contrast with some other additive manufacturing processes, such as stereolithography (SLA) and fused deposition modelling (FDM), which most often require special support structures to fabricate overhanging designs, SLS does not need a separate feeder for support material because the part being constructed is surrounded by un-sintered powder at all times. Furthermore, since the build chamber is always filled with powder material, multiple parts can be fabricated within the boundaries of the powder bed allowing for high volume productivity.

However, after a part has been made using a powder-based AM process, it is encapsulated by an amount of un-sintered powder known as a powder 'cake' which is left to cool before being manually removed from the build chamber. The un-sintered power surrounding the sintered part is then removed manually with a brush, vacuum, compressed air gun, tumbler, blasting, or the like. This cooling and manual removal of un-sintered powder, particularly from AM parts having relatively complex geometries, is labour intensive, time consuming and costly. Furthermore, such manual methods are often inefficient and it is often particularly difficult to remove all un-sintered powder from an AM part. Additionally, much of the un-sintered powder is currently disposed of and not recycled which is costly and environmentally unfriendly.

SUMMARY

It is an aim of certain embodiments of the present invention to provide a method of removing un-sintered powder from a part manufactured using a powder-based AM process in an efficient and controlled manner.

It is an aim of certain embodiments of the present invention to provide a method of cooling an AM part manufactured using a powder-based AM process in an efficient and controlled manner.

It is an aim of certain embodiments of the present invention to provide a method of recycling un-sintered powder in an efficient and controlled manner.

According to a first aspect of the present invention there is provided apparatus for removing powder from a powder-based additively manufactured part, comprising: at least one chamber to contain a fluid; a device to induce flow in the fluid to agitate and remove powder from a powder-based additively manufactured part located therein; and an ultrasound generating transducer to produce ultrasonic waves in the or a further fluid and agitate and remove powder from the powder-based additively manufactured part located therein.

Optionally, the ultrasound generating transducer is configured to periodically change a direction of the ultrasonic waves in the fluid.

Optionally, the chamber comprises one or more nozzles for introducing the flow in the fluid.

Optionally, the apparatus comprises an actuator to further agitate a part located in the fluid.

Optionally, the apparatus comprises a first reservoir for mixing water with a predetermined amount of surfactant, wherein the first reservoir is in fluid communication with the chamber.

Optionally, the apparatus comprises a second reservoir to contain a surfactant and controllably introducing the predetermined amount of surfactant into the first reservoir.

Optionally, the apparatus comprises a filter to separate powder particles from the fluid.

Optionally, the apparatus comprises a heater to heat the fluid in the chamber to a predetermined temperature.

Optionally, the apparatus comprises a vacuum pump to reduce a pressure in the chamber.

Optionally, the chamber is configured to be used as a fluid expansion chamber.

Optionally, the vacuum pump is used to reduce a pressure in the fluid expansion chamber.

Optionally, the apparatus comprises a further chamber and a vibratory support to agitate the part located thereon.

Optionally, the support comprises a sieve.

Optionally, the apparatus comprises a cooling chamber for cooling a powder cake including the part.

Optionally, the apparatus comprises a pump to flood the cooling chamber with an inert gas and a vacuum pump to remove the inert gas from the cooling chamber.

Optionally, the system comprises a powder fluidising chamber configured to cause the powder to act like a fluid and disengage from the part.

Optionally, the powder fluidising chamber is configured to cool the powder cake.

Optionally, the fluidising chamber comprises an air distributor, such as a porous membrane or the like.

Optionally, the fluidising chamber comprises a mesh to retain and support the 3D printed parts thereon.

Optionally, the fluidising chamber comprises a powder recovery region.

Optionally, the apparatus comprises a cryogenic blasting system for spraying a mixture of liquid $CO_2$ and compressed air at the part to remove powder therefrom.

Optionally, the cryogenic blasting system comprises at least one robotic arm configured to manoeuvre a jet nozzle and a further robotic arm comprising a gripper to hold a 3D printed part/s with respect to the nozzle.

Optionally, the jet nozzles are configured to spray cryogenic Carbon Dioxide ($CO_2$), also known as $CO_2$ crystals, or $CO_2$ snow mixed with compressed air onto the parts to remove the powder therefrom.

According to a second aspect of the present invention there is provided a method of removing powder from a powder-based additively manufactured part, comprising: inducing flow in a fluid to agitate a power-based additively manufactured part located therein; and producing ultrasonic waves in the or a further fluid to agitate the powder-based additively manufactured part located therein.

Optionally, the method comprises periodically changing a direction of the ultrasonic waves in the liquid.

Optionally, the method comprises mixing water with a predetermined amount of surfactant in a first reservoir in fluid communication with at least one chamber for receiving and containing the water-surfactant solution.

Optionally, the method comprises controllably introducing the predetermined amount of surfactant into the first reservoir from a second reservoir.

Optionally, the method comprises further agitating a part by an actuator.

Optionally, the method comprises separating powder particles from the fluid.

Optionally, the method comprises heating the fluid to a predetermined temperature.

Optionally, the method comprises drying the part and/or the removed powder.

Optionally, the method comprises vibrating a sieve on which the part is located.

Optionally, the method comprises cooling a powder cake supporting the part.

Optionally, the method comprises removing at least one element from the powder cake to form a cooling channel.

Optionally, the method comprises flooding a cooling chamber with an inert gas.

Optionally, the method comprises causing powder engaged with the part to act like a fluid and disengage from the part.

Optionally, the method comprises spraying a mixture of liquid CO2 and compressed air at the part to disengage powder from the part.

Optionally, the method comprises removing powder from the part by expansion of fluid inside the powder.

According to a third aspect of the present invention there is provided apparatus for removing powder from a powder-based additively manufactured part, comprising: a chamber for locating a powder-based additively manufactured part therein; a support mesh for supporting a powder cake comprising one or more parts therein; an inlet for introducing a gas into the chamber to flow throughout the powder cake and fluidise the powder to disengage from the part; and an outlet to allow the gas to exit the chamber.

According to a fourth aspect of the present invention there is provided a method of removing powder from a powder-based additively manufactured part, comprising: forcing a gas through a powder cake comprising one or more parts therein to cause the powder to fluidise and disengage from the part.

Optionally, the method comprises supporting the powder cake on a support mesh in a chamber and forcing the gas through the support mesh.

Optionally, the method comprises supporting the de-powdered part on the support mesh.

Optionally, the method comprises recovering removed powder from a side of the support mesh which is opposed to the part.

According to a fifth aspect of the present invention there is provided a method of removing powder from a powder-based additively manufactured part, comprising: mixing liquid carbon dioxide and compressed air to form carbon dioxide crystals; spraying the crystals at a powder-based additively manufactured part; and rapidly expanding the crystals to agitate and disengage un-sintered powder from the part.

Optionally, the method comprises locating the part in a predetermined position and orientation with respect to a nozzle for spraying the crystals at the part.

Optionally, locating comprises holding the part in the predetermined position and orientation by a first robotic element with respect to the nozzle coupled to a second robotic element.

According to a sixth aspect of the present invention there is provided a method of removing powder from a powder-based additively manufactured part, comprising: locating a powder-based additively manufactured part in a chamber, wherein un-sintered powder surrounding the part comprises a fluid; applying a negative pressure to the chamber to increase a temperature of the fluid substantially equal to a boiling temperature of the fluid; and expanding the fluid to agitate and disengage the un-sintered powder from the part.

Optionally, the fluid comprises water.

According to a seventh aspect of the present invention there is provided a method of cooling a powder cake supporting a powder-based additively manufactured part, comprising: removing at least one elongate element from a powder cake supporting a powder-based additively manufactured part to define at least one channel in the powder cake.

Optionally, the method comprises forming the elongate element in the powder cake by additive manufacturing.

Optionally, the method comprises causing a gas to flow through the channel to transfer heat from the surrounding powder.

Optionally, the method comprises determining an optimal location of the channel in the powder cake based on a specific heat capacity of the powder cake material $q_c$, a thickness of the powder cake with respect to a part supported therein $h_e$, and an initial temperature of the powder cake $T_c$.

BRIEF DESCRIPTION OF DRAWINGS

Certain embodiments of the present invention will now be described with reference to the accompanying drawings in which.

DETAILED DESCRIPTION

Figure 1A:
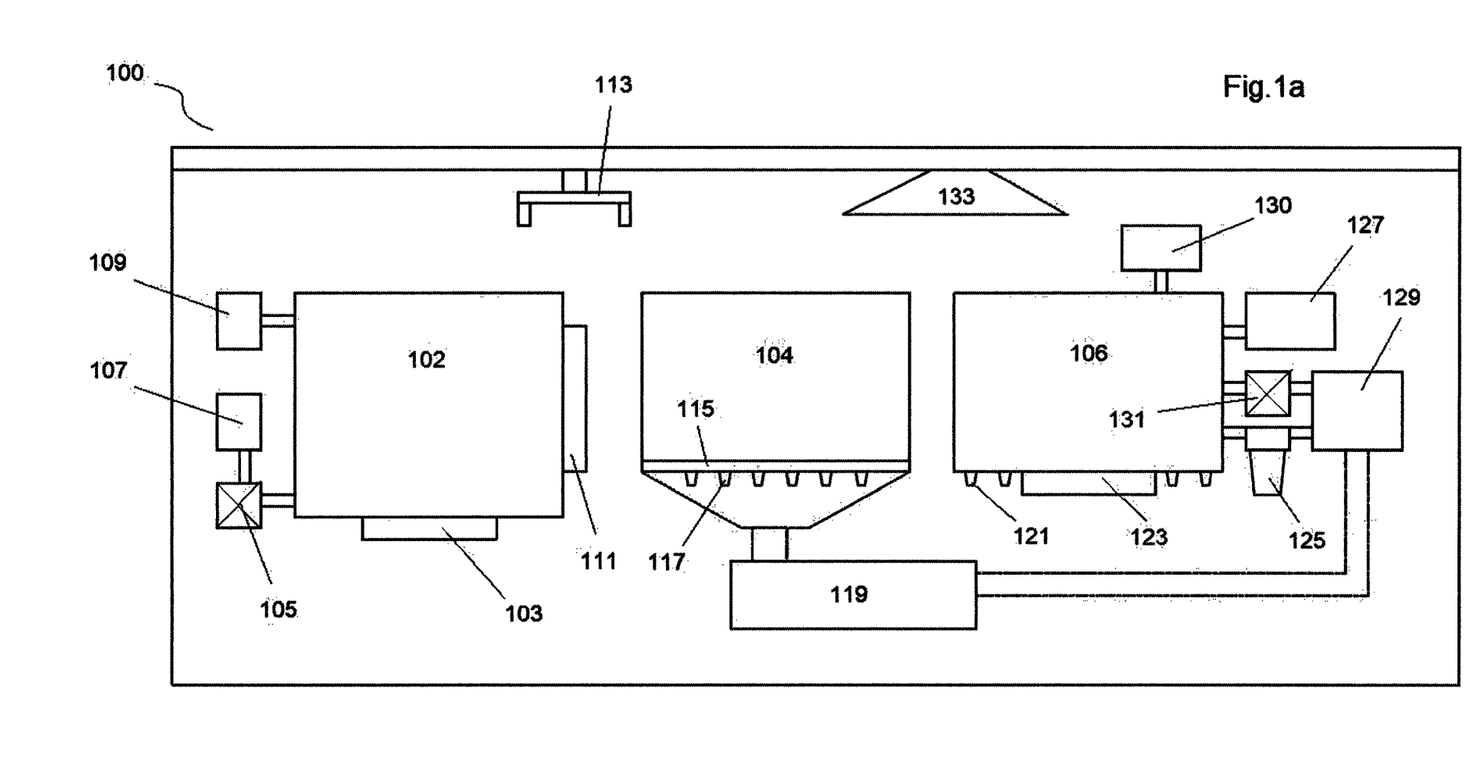
FIG. 1a illustrates apparatus according to certain embodiments of the present invention for de-powdering an AM part.

As shown in FIG. 1, apparatus 100 includes a cooling chamber 102 to cool down an as-printed powder cake of AM parts to a temperature suitable for de-powdering. The cooling chamber 102 is configured to control the temperature of the cooling chamber surfaces and interior, and aptly includes at least one thermocouple 103 to monitor the ambient temperature within the cooling chamber. A pump 105 may be provided to flood the cooling chamber with an inert gas stored in a canister 107, and a vacuum pump 109 may be provided to remove the inert gas from the cooling chamber. At least one heat exchanger 111 may be provided to control the temperature of the cooling chamber 102. The as-printed cake including one or more AM parts may be located in the cooling chamber 102 by a robotic actuator 113, e.g. transported automatically and in a controlled manner from a printing/processing chamber (not shown) to the cooling chamber 102.

The apparatus 100 further includes a first de-powdering chamber 104 having dimensions of around 600 mm×400 mm×400 mm which is analogous to the standard cake build size of typical powder-based industrial 3D printers. The first de-powdering chamber 104 includes a sieve shaker with an ultrasonic vibrating device to vigorously agitate the AM parts and remove the bulk of un-sintered powder therefrom. The sieve comprises a stainless-steel mesh 115 with a pore size larger than the diameter of the polymer powder particles, and the vibrating device comprises an array of ultrasonic transducers 117. The removed un-sintered powder is collected beneath the sieve in a powder collection chamber 119.

Figure 1B:
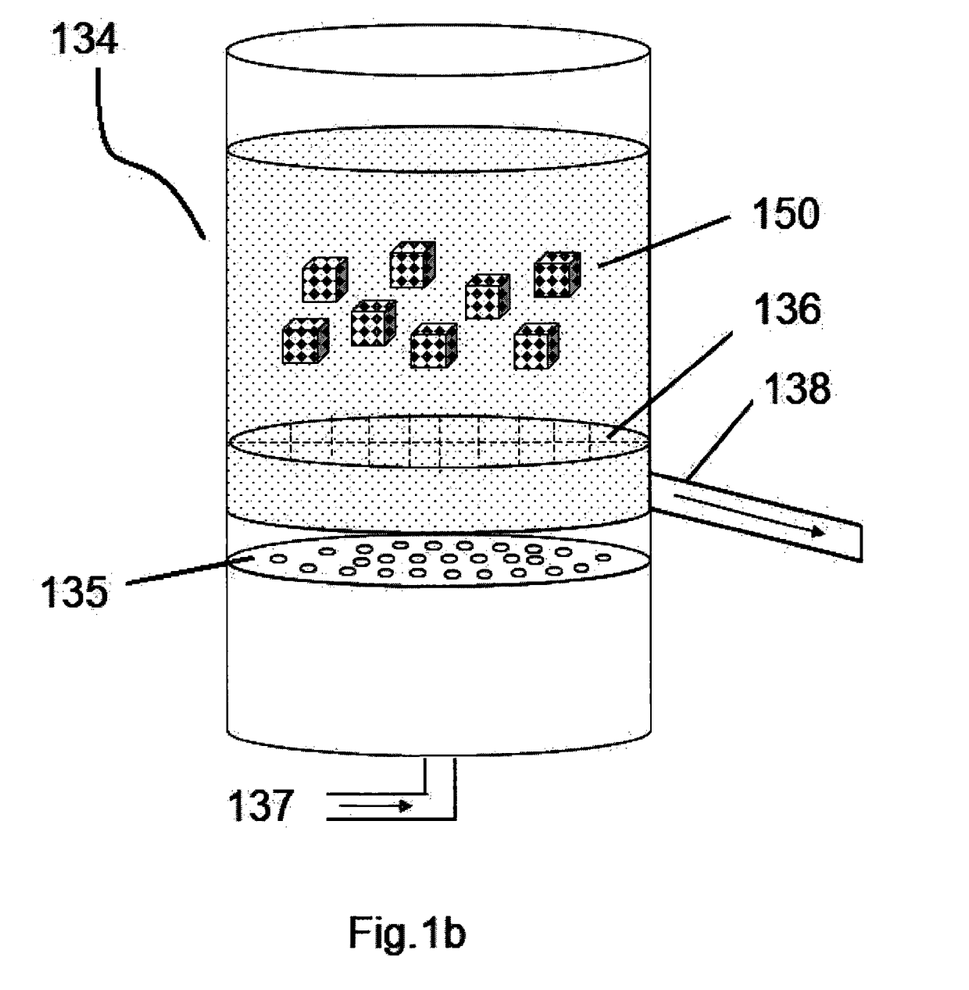
FIG. 1b illustrates a fluidising chamber of the apparatus.

Optionally, instead of, or in addition to, the first de-powdering chamber, the apparatus 100 may include a stainless-steel fluidising chamber 134 as illustrated in FIG. 1b. The fluidising chamber 134 may be cylindrical or rectangular in shape. The fluidizing chamber may have a cylindrical diameter of around 400 mm and a height of around 400 mm and in case of being substantially rectangular it may have inner dimensions of around 600 mm×400 mm×400 mm. The fluidising chamber 134 includes an air distributor 135, aptly comprising a porous membrane to ensure uniform air dispersion, a retaining mesh 136 made out of stainless-steel or other non-reactive material for supporting de-powdered AM parts 150, an inlet 136 for introducing air or an inert gas into the fluidising chamber 134 and an outlet 137 for the gas and loose powder to exit the chamber. The fluidising chamber 134 may be used alone or in combination with the other de-powdering apparatus/methods described herein to remove un-sintered powder from an AM part.

The apparatus 100 further includes a second de-powdering chamber 106 comprising a stainless-steel chamber encased in a stainless steel insulated housing; twenty four ultrasonic transducers 121 each operational at a frequency of around 30 kHz±2 kHz; two FMG 600 ultrasonic generators for producing a total of around 1200 watts r.m.s. (around 2400 watts PK) of ultrasonic power; a 1 kw silicone mat heater 123 located at the base of the chamber; a capillary temperature sensor; a pump to circulate water in the chamber; a particle filter 125 of around 270 mesh size (0.053 mm sieve opening) or the like based on the particle size of the powder; a virgin liquid tank 127 to store water-surfactant solution; a recycled liquid tank 129 to store recovered solution; and a control panel 130 with a user interface to control and monitor the process. The robotic arm/gripper 113, or the like, may be used to lift/lower the AM polymer parts into the second chamber 106 and optionally physically agitate the parts whilst in the chamber. Optionally, used solution may be discarded, in which case the recycled liquid tank 129 is not required. Aptly, the virgin liquid tank 127 is supplied with water, and surfactant is mixed in from a surfactant storage canister/reservoir. The water-surfactant solution is then controllably introduced into the second chamber 106 from the virgin liquid tank 127. This may be desirable to allow a new/different solution to be used for each process. Alternatively, a filtration system may be provided to clean the used water-surfactant solution and recycle it back to the chamber for another process. In this case, the virgin and used canisters would not be required.

The apparatus 100 further includes a drying system to dry the recovered un-sintered powder and the de-powdered AM polymer parts. The drying system includes a vacuum pump 131 able to reach absolute pressure below around 100 mBar, and preferably below around 20 mBar, to increase the speed of water evaporation from the powder and/or parts. The reduced pressure may be applied to the second de-powdering chamber 106 or to a separate drying chamber. The second de-powdering chamber 106 may be air-tight to be able to sustain a vacuum and be used as a fluid expansion chamber for improved de-powdering of the difficult to reach cavities of the AM part/s. Alternatively, a separate expansion chamber may be used alone or in combination with the first and/or second de-powdering chambers 104,106. Aptly, the expansion chamber is configured to reduce a pressure therein, e.g. to around 20 mbar, to cause the water trapped in the powder cake, such as any remaining 'difficult-to-reach' powder-filled cavities, to boil due to its specific vapour pressure which in turn expands and forces the trapped powder away from the part surface/s. The powder cake may be wetted in the expansion chamber or a separate chamber prior to the fluid expansion process being performed.

Figure 1C:
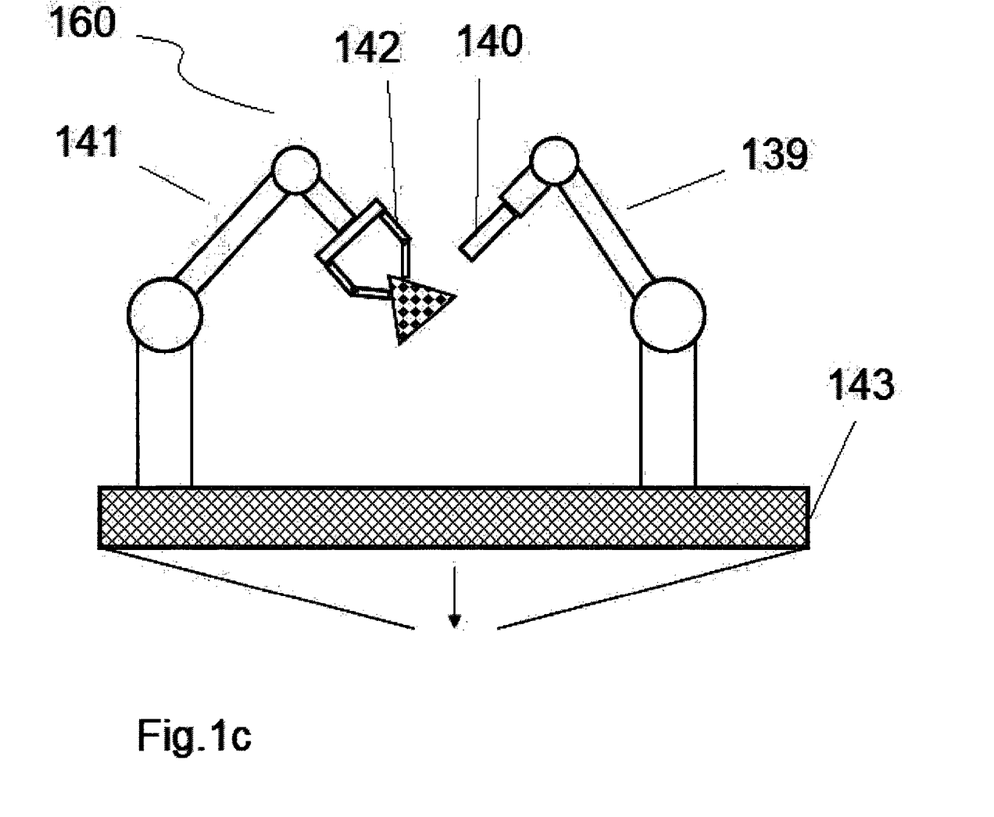
FIG. 1c illustrates a cryogenic blasting system of the apparatus.

Optionally, the apparatus 100 may comprise a cryogenic blasting system 160 as illustrated in FIG. 1c including at least one robotic arm 139 configured to manoeuvre a jet nozzle/s 140 for spraying a mixture of liquid $CO_2$ and compressed air at the AM part to further remove powder therefrom, and at least one further robotic arm 141 comprises a gripper 142 to hold the AM part in a desired position and orientation with respect to the nozzle/s. When liquid $CO_2$ is mixed with compressed air at around 6-8 bar, $CO_2$ crystals are produced which, upon contacting the surface of the part/s, expand rapidly producing an explosive force which agitates and disengaging the powder from the part. The blasting system 160 may further include an extraction platform 143 for collecting loosened powder. The cryogenic blasting system 160 may be used alone or in combination with the other de-powdering apparatus/methods described herein to remove un-sintered powder from an AM part.

Optionally, the AM parts may be automatically categorized and sorted into different bins based on part geometry once they are dry and free from powder. The robotic arm 113 with a gripper or the like may be used to handle the parts, while a stereoscopic vision system 133 may be used to identify and track the positions of the different parts.

Optionally, the same robotic arm 113 may be used to hold the parts in place in the cryogenic system 160 together or instead of the further robotic arm 140.

Optionally, the vision system 133 may be used in the cryogenic blasting system 160 to better identify the powdered areas and help direct the jet nozzle 140 on to the AM part.

Figure 2:
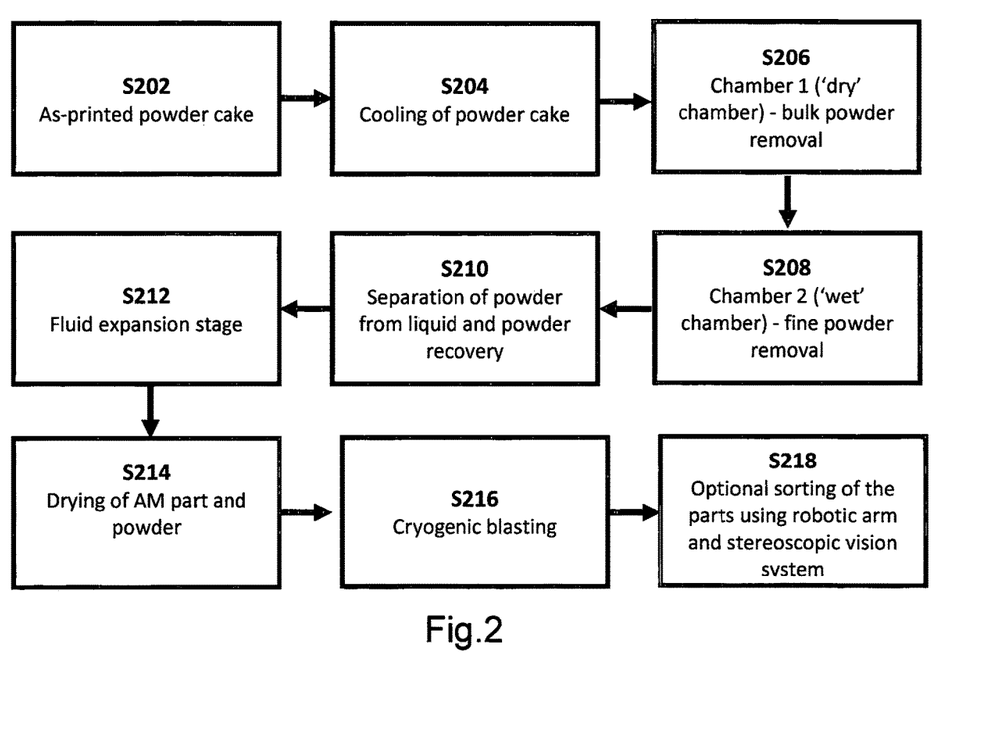
FIG. 2 illustrates a flow diagram outlining a de-powdering process according to certain embodiments of the present invention.

With reference to the flow diagram of FIG. 2, a method 200 according to certain embodiments of the present invention of removing un-sintered powder from a part manufactured using a powder-based AM process will now be described.

At step S202, the as-printed powder cake containing one or more laser-sintered AM parts is removed from the build chamber of an additive manufacturing machine either manually or desirably by a robotic arm 113 or the like and into the cooling chamber 102 of the apparatus 100.

At step S204, the cooling chamber 102 homogeneously cools down the as-printed cake of AM parts to a temperature suitable for the de-powdering process. This is done in a controlled manner to reduce high temperature gradients within the part cake and thus to avoid shrinkage and warping of the AM parts during crystallisation. The cooling chamber 102 may contain either an inert gas atmosphere or a liquid with a relatively low heat capacity. The liquid with a relatively low heat capacity may be alcohol, sesame oil or other suitable liquid with a heat capacity of between around 1-3 kJ/kg K. A relatively low heat capacity liquid allows for faster temperature response of the liquid, which in turn can be picked up by the thermocouple 103 and transferred to a Programmable Logic Controller (PLC). The PLC ensures the temperature is kept within predefined limits which are controlled by the heat exchanger/s 111. Low heat capacity of the liquid allows for the required accuracy in temperature control by the heat exchanger/s.

Aptly, cooling will begin at a lower temperature than the crystallization temperature of the particular polymer of the AM part/s. For Nylon™12, for example, crystallization slows down significantly below 120° c. (although this temperature will change based on the temperature history and age of the powder before melting). Therefore, by keeping the cooling temperature below the crystallization temperature, the process ensures the mechanical integrity of the AM polymer parts. Optionally, the cooling chamber may have an atmosphere of inert gas to prevent oxidation of un-sintered powder while at higher temperatures. Because AM parts will be more pliable and deform more easily at higher temperatures, the rate of cooling of the cake will increase as the core cake temperature decreases. At temperatures of around 50-60° C. or lower, the part cake can be safely removed from the cooling chamber and the de-powdering steps can begin.

Optionally, the as-printed cake of AM parts may be cooled by including cooling channels or the like within the build. The cooling channels may include a flexible, chain-like structure that define and open up cooling channels in the powder cake when removed. The powder cake may be cooled through these cooling channels by circulation of a gas. The cooling channels are added into the CAD design of the build using an algorithm. The algorithm locates the cooling channels in optimum locations for the matrix to lose heat and thereby cool in an efficient and desirable manner. The parameters used to define locations of the cooling channels includes specific heat capacity of the powder cake material qc, thickness of the powder cake with respect to a part supported therein he, and initial temperature of the powder cake Tc.

Once the as-printed powder cake of AM parts has been sufficiently cooled, it is placed into the first de-powdering chamber 104 (step S206) where the vibratory sieve shaker removes a bulk amount of un-sintered powder from the AM parts. The robotic actuator/gripper 113 may transport the cake from the cooling chamber 102 to the first de-powdering chamber 104. Vibrations ensure the mesh screen 115 remains free from 'blinding' where particles of powder combine and block the pores of the mesh screen. For a stainless-steel mesh, excitation at a resonant frequency of around 35,000 Hz essentially makes the steel mesh effectively frictionless and removes blockages. The robotic actuator 113 may also be used to remove parts of the powder cake without damaging the AM parts located therein based on knowledge of the 3D print file used to manufacture the AM parts within the powder bed. This may increase the surface area of the powder cake and may therefore reduce the time during the cooling stage. Removed un-sintered powder is collected for reuse via the powder collection chamber 119.

Optionally, before or instead of the vibratory shaker 104, the as-printed cake of AM parts may be de-powdered in the fluidised chamber 134. The air or other inert gas is dispersed by the distributor 135, for example a porous membrane. The distributed air flows throughout the cake fluidising and cooling the powder bed. The fluidised loose powder becomes free from the part/s 150 to flow, together with the air, through the outlet 138 which is aptly coupled to the recovered powder chamber 119. The 3D printed parts that are free from bulk loose powder stay on the retaining mesh 136. The speed of the inlet air, as well as the size and distribution of the membrane pores, are selected according to the type of powder to be fluidised.

Optionally, the fluidising chamber 134 may act as a cooling system instead of the cooling chamber 102.

Optionally, the fluidising chamber 134 may act as a primary de-powdering step instead of the first de-powdering chamber 104.

After the bulk of the un-sintered powder has been removed from the AM parts in the first de-powdering chamber 104, the parts are moved to a second de-powdering chamber 106 (step S208) and immersed in a water-surfactant (amphiphilic solute) solution. Aptly, the parts are moved from the first chamber to the second chamber by automated and controlled means, such as the robotic arm 113, conveyor, or the like. The primary function of the amphiphilic solute (surfactant) is to help to reduce the viscosity of the water as hydrophobic ends of the surfactant molecules push away (repel) the water molecules, which in turn weakens the hydrogen bonds between the water molecules and helps to break down (lower) the surface tension. In water, surfactants form aggregates, such as micelles, where the hydrophobic tails form the core of the aggregate and the hydrophilic heads are in direct contact with the liquid. The surface tension of water is reduced when surfactants are present by adsorbing at the liquid-air interface. Lower viscosity of water helps bubbles to form as lower surface tension between water molecules eases bubble initiation and growth by the sonic energy. Sodium dodecylbenzenesulfonate ($C_{12}H_{2s}C_6H_4SO_sNa$) is preferably used as a surfactant but other amphiphilic agents may be used including, but not limited to, phospholipids, cholesterol, glycolipids, fatty acids, Lipoproteins, bile acids, saponin, or the like.

The second chamber 106 is configured to heat up the water-surfactant solution to around 40-60° C., as a relatively high temperature helps to further reduce the viscosity of the water. The mat heater 123 is used for this purpose. For non-ionic surfactants, for example octanol, the solubility of the oxygen group is the result of hydrogen bonding. Hydrogen bonding in general decreases with increasing temperature and hence the water solubility of non-ionic surfactants also decreases. In other words, the temperature is optimized for the surfactant used. The concentration of the surfactant is preferably at least at the Critical Micelle Concentration; the minimum concentration to form a monomolecular layer which has been found to be ideal for cleaning the AM parts.

Once the AM polymer parts are immersed inside the second chamber, the two FMG 600 ultrasonic generators are activated and the ultrasonic transducers 121 start to produce sonic energy at a frequency of around 30 kHz±2 kHz. This causes bubbles to form and implode within the water-surfactant solution. The collapsing bubbles emit microjets, a high velocity liquid rush, which when in close vicinity to the AM polymer part/s, transfers energy and agitates the support powder structure causing it to break away (de-powder) from the AM polymer part. Therefore, the higher the surface energy between the bubble forming water-surfactant solution and the AM polymer part, the faster the de-powdering process within the second chamber 106. Overall, the speed of de-powdering depends on the power of the ultrasonic generators, viscosity of the liquid, and the surface area between the liquid and the AM polymer part.

To increase the efficiency of the de-powdering process the robotic gripper 113, or other suitable actuator, may be used to periodically physically agitate the AM polymer part/s within the second chamber 106. This causes some of the powder support structure to fall away thus increasing surface contact area between the solution and the AM polymer component. Because the density of AM polymer parts is comparable to that of water, a small amount of agitation by a gripper or actuator will cause the parts to change orientation, allowing for even cleaning.

In addition, the ultrasonic transducers 121 may periodically carry out a frequency sweep to ensure uniform bubble cavitation in the solution across the second chamber. Frequency sweep is a small regular deviation in the driving frequency of the transducers to compensate for minor differences in transducer manufacturing tolerances. Furthermore, a pump (not shown) induces current/s within the second de-powdering chamber (or a separate chamber) to remove support powder from the AM part/s. Preferably, the powder cake is agitated by the currents before the ultrasonic agitation, but aptly the powder cake may be agitated by the currents after the ultrasonic agitation. Further alternatively, the powder cake may be located in a gas atmosphere, e.g. air, and agitated by the jet currents induced therein, or in a liquid, e.g. water. The jet current agitation may occur in the same chamber as the ultrasonic agitation, or in a different chamber. Furthermore, the pressure of the gas atmosphere may be reduced to increase the power and agitating efficiency of the jet currents.

When combined, controlled agitation by currents in liquid or a gas, and bubble cavitation in a liquid, and optionally frequency sweep and/or robotic agitation, effectively removes the powder support from the AM polymer part/s, desirably within a few hours.

Optionally, the bulk of the powder may be removed from the AM parts by the jet currents when immersed in the second de-powdering chamber 106. The jet currents may be periodically turned on/off to agitate the powder, before the cavitation process starts. Aptly, the jet stream functionality may be integrated into the second chamber 106 and the first chamber 104 including the sieve shaker may not be required.

At step S210, the water-surfactant solution is filtered through the mesh filter 125. The robotic gripper 113 or similar device may periodically swipe the mesh to prevent it from blockage, or alternately, the mesh is agitated with a vibration motor to prevent 'blinding'. The filtered water-surfactant solution is collected and stored in the recovered fluid tank 129, whereas the powder particles remain within the chamber 106.

At step S212, a vacuum is applied in the secondary de-powdering chamber 106, containing 'wet' 30 printed parts. Once the vacuum reaches around 20 mbar, the water trapped in the remaining 'difficult-to-reach' powder-filled cavities starts to boil, due to its specific vapour pressure. The boiling water expands and pushes out the trapped powder with the expansion force. At the end of step S212, the chamber 106 is de-pressurised. If necessary, the parts in chamber 106 are re-wetted and the vacuum is applied for another fluid expansion run to further remove remaining powder from the part. Optionally, an additional bath of water without a surfactant may be used to clean the parts of any residual surfactant and powder on the surface.

The level of vacuum pressure may differ according to the type of liquid used and the initial temperature of the liquid at the start of Step S212.

At step S214, the heater 123 of the second chamber is set to at least around 60° C.-80° C., preferably around 80° C., to dry the recovered un-sintered powder and the 30 printed part/s. Once the powder is dry, the heater is switched off. Time is allowed for the powder to cool before it is collected for re-use. Optionally, other drying techniques such as fluidized bed drying as described above may be used to increase the speed of the powder drying process. The recovered un-sintered powder can then be recycled back into the AM process, thus reducing waste.

Optionally, the de-powdered AM polymer parts are dried using vacuum drying. The reduced pressure may be applied to the second chamber or to a separate vacuum chamber in which the parts are placed.

At step S216, the robotic gripper 113 or similar device removes the de-powdered AM polymer parts from the second de-powdering chamber 106 and places it onto the cryogenic blasting system 138. In the system 138, the part is being held by the robotic gripper 140 over the extraction system 141, while the robotic arm 139 equipped with the jet nozzle sprays the 3D printed part with the CO2 crystals mixed with compressed air.

The CO2 is supplied for example from liquefied CO2 bottles, which, when mixed with compressed air at around 6-8 bar produces CO2 crystals, also known as CO2 snow or cryo-snow. Upon touching the surface of the 3D printed polymer part, the CO2 crystals expand rapidly producing an explosive force. When directed at any remaining powder areas, this force further helps to remove the powder.

The un-sintered powder is collected by via extraction platform 143 and optionally into the powder collection chamber 119 coupled thereto.

The vision system 133 aptly helps direct the jet nozzle at any remaining powder areas.

Optionally, the 3D printed parts could be placed within the enclosed chamber with a plurality of nozzles pointing onto the parts. The nozzles may rotate around for the cryogenic spray to cover different areas.

Optionally, at stage S218, after the AM components have been de-powdered, they are automatically categorized and sorted into different bins based on part geometry using the vision system 133 and robotic gripper 113.

In a first example, a Nylon™12 AM part in an as-received condition (i.e. not de-powdered) was treated using the fluidised bed, ultrasonic tank and cryogenic blasting in total for 2.5 hours. The initial mass of the Nylon™12 part before de-powdering was 94.7 g, which included the weight of the AM part itself, its powder support and any other un-sintered powder attached to the part. After the de-powdering process, the powder support structure was fully removed from the component and the part weighed 47.26 g. The test showed the ability of the apparatus and method according to certain embodiments of the present invention to automatically remove powder structures from a Nylon™12 AM component within several hours.

In a second example, a Thermoplastic Polyurethane (TPU) AM part in an as-received condition (i.e. not de-powdered) was treated for 2 hours. The initial weight of the TPU AM part before de-powdering was 155.2 g, which included the weight of the AM component itself, its powder support structure and any other un-sintered powder attached to the AM part. After the de-powdering process, the powder support structure was fully removed from the part and the part weighed 93.1 g. The test showed the ability of the apparatus and method according to certain embodiments of the present invention to automatically remove powder structures from a TPU AM part within several hours.

Certain embodiments of the present invention therefore provide an apparatus and method for removing un-sintered powder from AM parts manufactured using powder-based processes, including but not limited to Selective Laser Sintering (SLS), Multi Jet Fusion (MJF), High Speed Sintering (HSS), Electron-Beam Melting (EBM) and Material Jetting (MJ). The apparatus and method is configured to remove powder support structures from many AM parts made from polymers including but not limited to Nylons (Nylon™12 (PA220 Duraform™ PA), Nylon™11 (Duraform™ EX Natural, Duraform™ EX Black), Glass Filled Nylon™ (Duraform™ GF), Durable Nylon™ (Duraform™ EX), Fiber-filled Nylon™ (Duraform™ HST) or the like), Thermoplastic Polyurethane (TPU), TPE-210 elastomer materials, PMMA, ABS, or the like. The apparatus and method is configured to de-powder a full, as-printed cake of AM components taken directly from the printing stage in a controlled and efficient manner. The use of two separate de-powdering chambers provides the operator easy access to the dry powder from the first chamber as well as the wet powder from the second chamber which requires a further drying step. The first chamber acts to remove and recover a bulk amount of un-sintered powder from an AM part/s and the second chamber acts to remove and recover a finer amount of un-sintered powder from the gaps and corners of relatively complicated AM parts. However, a single chamber may be used to agitate the powder cake by inducing a current/jet stream in a liquid or gas, and also by causing ultrasonic waves in the same or a different liquid.

The invention claimed is:

1. Apparatus for removing powder from a powder-based additively manufactured part, comprising:
   a chamber for locating a powder-based additively manufactured part therein;
   a support mesh for supporting a powder cake comprising one or more parts therein;
   an inlet for introducing a gas into the chamber to flow throughout the powder cake and fluidise the powder to disengage from the part;
   an outlet to allow the gas to exit the chamber; and
   a cryogenic blasting system for spraying a mixture of liquid $CO_2$ and compressed air at the powder-based additively manufactured part to remove powder therefrom.

2. The apparatus according to claim 1, further comprising an air distributor comprising a porous membrane configured to uniformly disperse air throughout the chamber.

3. The apparatus according to claim 1, wherein the cryogenic blasting system comprises a first robotic arm configured to grip and orient the powder-based additively manufactured part into a desired position and a second robotic arm comprising one or more jet nozzles configured to spray a mixture of liquid $CO_2$ and compressed air at the powder-based additively manufactured part to remove powder therefrom.

4. The apparatus according to claim 1, wherein the apparatus further comprises a further chamber and a vibratory support configured to agitate the powder-based additively manufactured part located thereon.

5. Apparatus for removing powder from a powder-based additively manufactured part, comprising:
   a chamber for locating a powder-based additively manufactured part therein;
   a support mesh for supporting a powder cake comprising one or more parts therein;
   an inlet for introducing a gas into the chamber to flow throughout the powder cake and fluidise the powder to disengage from the part;
   an outlet to allow the gas to exit the chamber;
   a cooling chamber for cooling a powder cake including the powder-based additively manufactured part;
   a pump configured to flood the cooling chamber with an inert gas; and
   a vacuum pump configured to remove the inert gas from the cooling chamber.

\* \* \* \* \*